(12) United States Patent
Canali et al.

(10) Patent No.: US 7,742,403 B2
(45) Date of Patent: Jun. 22, 2010

(54) DEADLOCK DETECTION IN A TELECOMMUNICATION NETWORK

(75) Inventors: Massimo Canali, Vimercate (IT); Andrea Maria Mazzini, Pessano c/Bornago (IT); Stefano Volonte', Monza (IT)

(73) Assignee: Alcatel, Paris (FR)

( * ) Notice: Subject to any disclaimer, the term of this patent is extended or adjusted under 35 U.S.C. 154(b) by 859 days.

(21) Appl. No.: 11/384,493

(22) Filed: Mar. 21, 2006

(65) Prior Publication Data

US 2006/0215549 A1 Sep. 28, 2006

(30) Foreign Application Priority Data

Mar. 23, 2005 (EP) ................................. 05290643

(51) Int. Cl.
*G06F 11/00* (2006.01)

(52) U.S. Cl. ..................................................... 370/228

(58) Field of Classification Search ................. 370/228, 370/210, 252; 395/650; 709/238
See application file for complete search history.

(56) References Cited

U.S. PATENT DOCUMENTS

| | | | | |
|---|---|---|---|---|
| 5,440,743 | A * | 8/1995 | Yokota et al. ................ | 710/200 |
| 2003/0067867 | A1 * | 4/2003 | Weis ........................... | 370/210 |
| 2003/0137932 | A1 | 7/2003 | Nishioka et al. | |
| 2003/0140165 | A1 * | 7/2003 | Chiu et al. ................... | 709/238 |
| 2004/0057389 | A1 * | 3/2004 | Klotz et al. .................. | 370/252 |
| 2004/0233843 | A1 | 11/2004 | Barker | |
| 2005/0105462 | A1 * | 5/2005 | Belotti et al. ................ | 370/216 |

OTHER PUBLICATIONS

Adwuche et al: "RSVP-TE: Extensions to RSVP for LSP Tunnels" IETF Standard, Internet Engineering Task Force, IETF, CH, Dec. 2001, XP015008988.

* cited by examiner

*Primary Examiner*—Derrick W Ferris
*Assistant Examiner*—Mang Yeung
(74) *Attorney, Agent, or Firm*—Carmen Patti Law Group, LLC (57) ABSTRACT

A method is described for checking deadlock in a telecommunication network including a first activated backup connection for protecting traffic over a first intended connection. The method includes the steps of checking a reversion blocked status of the first intended connection by checking if the segments of the first intended connection are available or not available, in case of detecting the reversion blocked status of the first intended connection identifying activated backup connections using the not available segments of the first intended connection, identifying the corresponding intended connections, checking the reversion blocked status of each identified corresponding intended connection by checking if the corresponding segments are available or not available, in case of detecting the reversion blocked status of an identified corresponding intended connection checking if a corresponding not available segment is included in the first backup connection. The method further provides the indication of the intended connections involved in the deadlock.

10 Claims, 8 Drawing Sheets

Fig. 4 ns, for protecting the intended connections providing a backup connection in case of a failure on a segment of the intended connection. In order to perform these functions, it stores into a MIB (Management Information Base) the list of identifiers of the intended connections within the controlled domain and for each intended connection the source and destination network elements and the list of the intermediate network elements (or the list of segments, identified by two network elements). In a traffic engineered network including a protection mechanism, the central manager stores for each intended connection the list of the intermediate network elements calculated by the TE tool and in case of a backup connection activated for protecting the intended connection it also stores the list of the intermediate network elements of the backup connection. The centralized manager can be connected directly to the managed network elements or indirectly through channels carrying control data in the same physical network carrying user data or through a different physical network carrying only control data. In the new network architectures, based on the Automatically Switched Optical Network (ASON) defined in ITU-T G.8080/Y.1304 (11/2001), the backup connection is calculated by a control plane element (CPE), which controls one or more network elements, also defined Transport Plane Elements (TPE), for protecting the intended connections starting from the controlled network element (also defined source network element); in order to perform these functions, each CPE stores the list of identifiers of the intended connections starting from the controlled network element and stores for each intended connection the source and destination network elements, the list of the intermediate network elements (or the list of segments, identified by two network elements) of the intended connection calculated by the TE tool and in case of a backup connection activated for protecting the intended connection it also stores the list of the intermediate network elements of the backup connection. The CPEs are schematically indicated in FIG. 1.1-1.5 with CPE1, CPE2, CPE3, CPE4, CPE5, CPE6, CPE7, CPE8, CPE9 and CPE10; they are interconnected with each other and communicate according to a signaling protocol, in order to provide a fast detection of a failure, a fast and efficient configuration of new connections within the Transport Plane, modify the connections previously set up and perform a faster restoration function providing backup connections for protecting the intended connections. Various signalling protocols can fit the ASON architecture, like the Resource Reservation Protocol (RSVP) defined in RFC2205, RFC2209 and RFC2750, the Resource Reservation Protocol—Traffic Engineering (RSVP-TE) defined in RFC3209 and ITU-T G.7713.2, the Label Distribution Protocol (LDP) defined in RFC3036, the Constraint Based—Label Distribution Protocol (CR-LDP) defined in ITU-T G.7713.3 and RFC3472), the Private Network to Network Interface (PNNI) defined in ITU-T G.7713.1.

Referring to RSVP protocol, the base specification was designed to allow network elements (routers) to decide in advance, that is before the provisioning of the connection, if the network can meet the requirements of a Quality of Service (QoS) defined for the connection. The configuration of a new intended or backup connection is performed by transmitting and receiving a Path message, in case of a successful configuration of the connection, a Resv message in the reverse direction of the Path message or receiving a Path_err message in case of an unsuccessful configuration (for example for lack of network resources). Reversion is performed in a similar way as a new intended connection, using Path and Reservation (Resv) messages, but in a 'make-before-break' manner, that is the intended connection is setup before the backup connection is torn down. A number of extensions were added to support provisioning and maintenance of explicitly routed connections (defined LSP=label switched paths). Finally, RSVP-TE allows the aggregation of connections, defined LSP tunnels, which share a common route and a common pool of shared network resources, reducing the amount of information carried in the network. Moreover, when a failure is detected on a segment, it must be notified as fast as possible to all the source CPEs controlling the source network element of the intended connections crossing the failed segment, in order to route the traffic from the intended to a backup connection. A Notify message is defined for reporting of failures and it is described by Internet draft draft-ieff-mpls-generalized-rsvp-te-09.txt (September 2002), issued by IETF and updated periodically; this message includes the address of the CPE controlling the network element which has detected the failure.

In traffic engineered network the concept of dynamic sharing of network resources applies: a network resource (a segment or part of the bandwidth of the segment) can be assigned to more that one backup connection, while it must be assigned to one intended connection. For example, after rerouting of user traffic from a first intended to a first backup connection, a second backup connection can use available segments of the first intended connection (that is segments not anymore used by the first intended connection and not affected by a failure) for protecting a second intended connection affected by a failure. This mechanism allows a better usage of network resources, but the concurrent usage of the same resources by different connections can create blocking situations, also defined as "deadlock". The deadlock is more probable in an ASON network, because of the parallelism of the distributed managers, that is of the CPEs, which can require to use the same resources (segments) at nearly the same time, for example for restoration purposes.

FIGS. 1.1, 1.2, 1.3, 1.4 and 1.5 show an example of the steps required for having a deadlock involving two intended connections; the intended connections (c1, c2) are indicated with a continuous line, the backup (b, b2, b1) with a broken line. Referring to FIG. 1.1, the first intended connection (c1) crosses network elements 1, 8 and 10, the second (c2) crosses 2, 3, 4, 6 and 9. At time t1 (FIG. 1.2) a failure F1 occurs on segment 8-10 of the first intended connection and a first backup connection (b) is provided (pre-calculated or calculated run-time) for protecting the first intended connection, crossing network elements 1, 4, 7, 9 and 10. At time t2 (FIG. 1.3) a failure F2 occurs on segment 4-6 of the second intended connection and a second backup connection (b2) is provided for protecting the second intended connection, crossing network elements 2, 1, 8 and 9: the second backup connection is using segment 1-8 of the first intended connection, which is available because the first intended connection is rerouted over the first backup connection. At time t3 (FIG. 1.4) a failure F3 occurs on segment 4-7 of the first backup connection and a third backup connection (b1) is provided (usually calculated run-time) for protecting the first intended connection, crossing network elements 1, 2, 3, 5, 7, 9 and 10: the third backup connection is using segment 2-3 of the second intended connection, which is available because the second intended connection is rerouted over the second backup connection. FIG. 1.5 shows the deadlock of the first and second intended connections: when all failures clear, neither b1 nor b2 can revert to c1 and c2 respectively, because one segment of c1 and c2 is not available. The figures show schematically the network resources interconnecting the network elements. For example, segment 1-2 carries two backup connections (b1 and b2); this is possible using one physical medium (an optical fibre, a coaxial cable, a radio link) carrying the two backup connections on different time slots (or on different wavelenghts) or alternatively it is possible using two different physical medium. In this example segment 1-2 must provide enough network resources for carrying b1 and b2 between network element 1 and 2 and b2 must use on segment 1-8 the same network resource (physical medium and bandwidth) used by c1.

Figure 2:
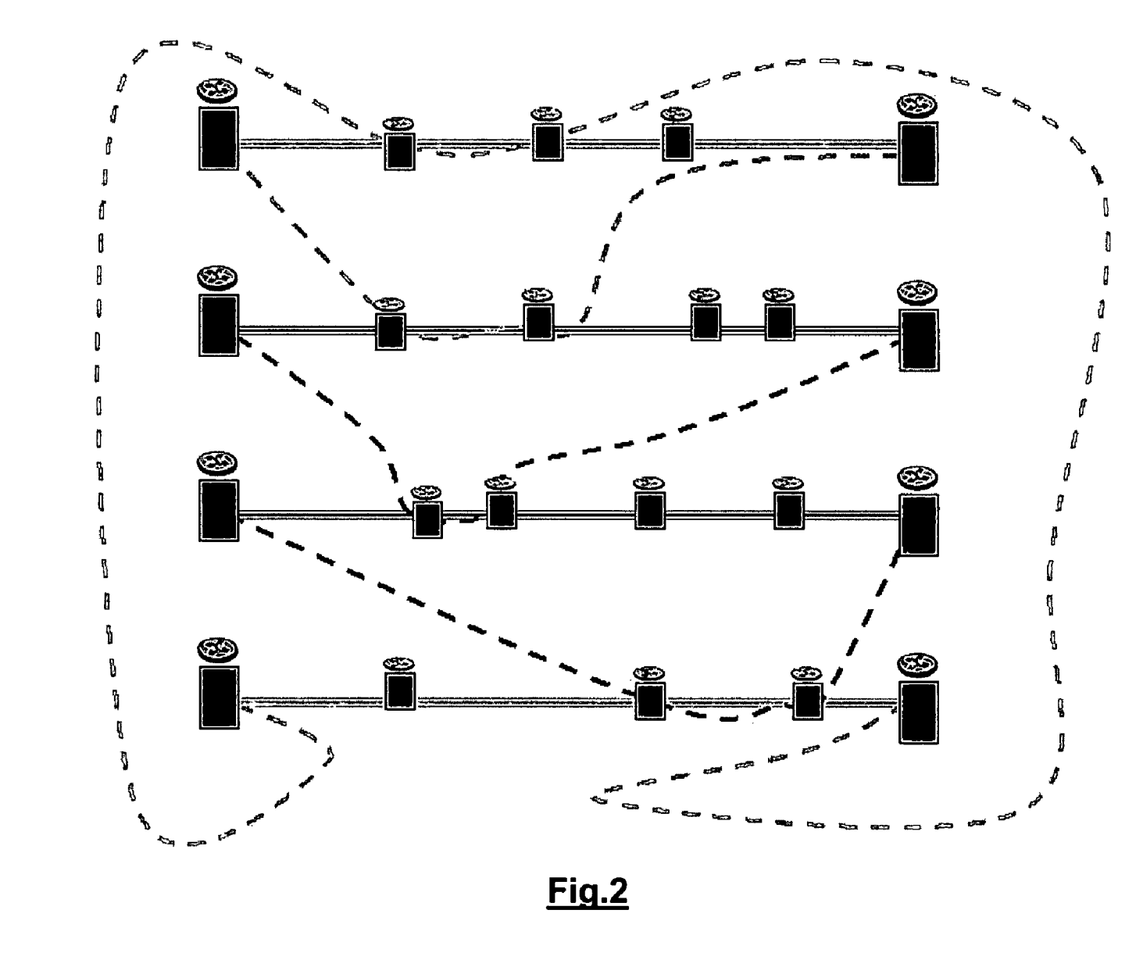
FIG. 2 shows a deadlock involving four intended connections.
Figure 15:
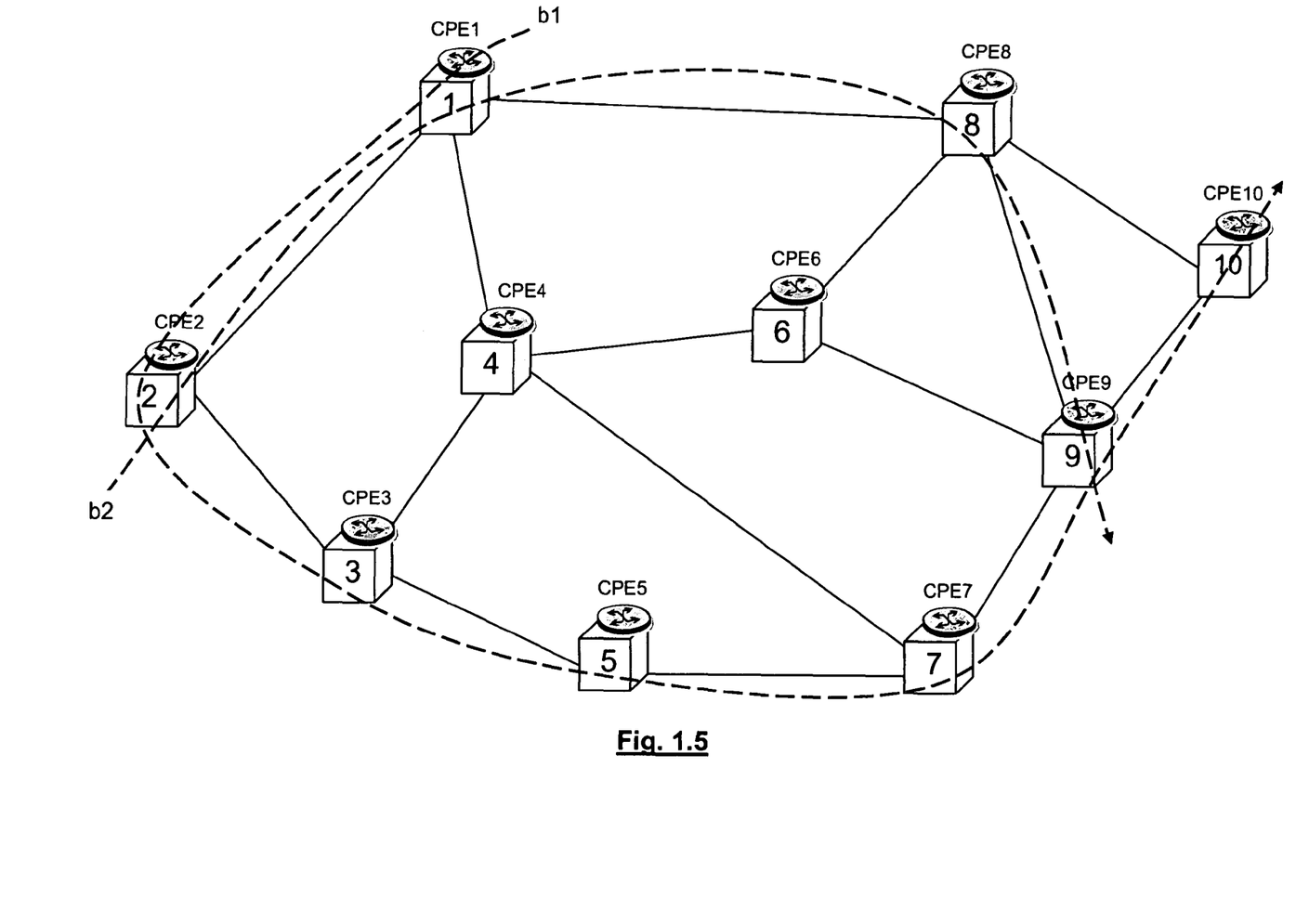

FIG. 1.5 shows the deadlock involving two connections, but in a telecommunication network carrying many connections the deadlock can involve more than two connections; for example, FIG. 2 shows the deadlock involving four connections, wherein each backup connection is using a segment of a subsequent intended connection. In this scenario the reversion from the backup to the intended connection is not possible, although any failure is present in the network.

Figure 14:
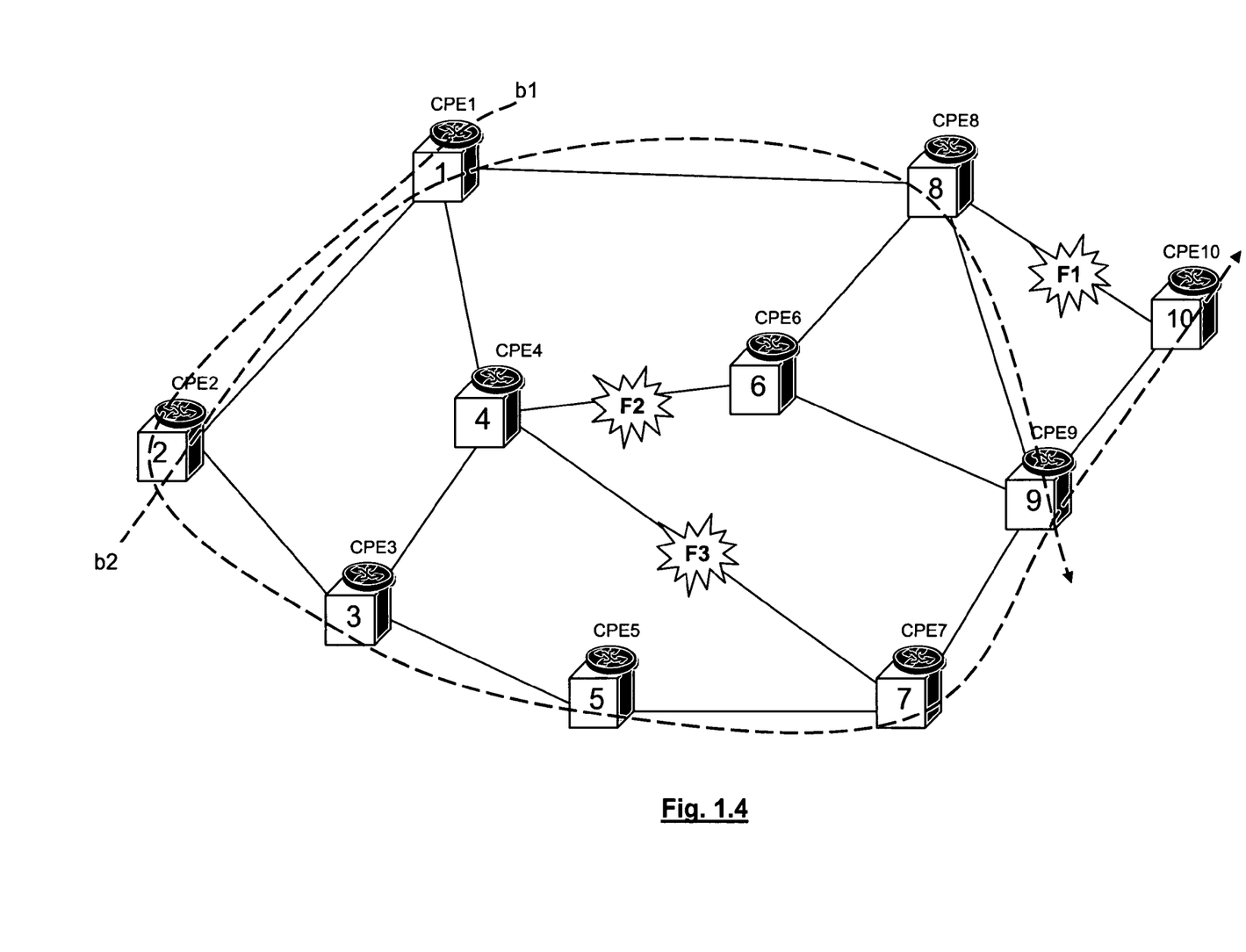

Nowadays the deadlock is avoided, that is the deadlock situation is not reached but it is prevented according to two solutions. In the first solution partial sharing of network resources is performed: a group of segments is assigned in advance for providing backup connections and these segments are used for protecting different intended connections. The deadlock is avoided defining a rule for assigning the shared segments, for example defining a different priority for each intended connection within the network or using a first come-first serve rule. Referring to priority rule, a first example is when two different intended connections require to use the same segments for protection for a failure on a segment of the corresponding intended connection: these segments are assigned to the intended connection having the highest priority (this is also indicated with 'contention'). In this first solution usage of network resources is not optimized (because only segments of the group are shared) and consequently more resources are required for protection of intended connections; moreover, it requires the definition of a rule, which can be complex in case of a network including many connections. In the second solution complete sharing of network resources is performed; in fact, as explained above, after routing of traffic from an intended to a backup connection, available segments of the intended connection can be used for backup connections, that is also segments of intended connections can be dynamically shared. In this second solution deadlock is avoided because an existing connection which was first successfully established, is intentionally torn down (this is also indicated with 'pre-emption'); referring to FIG. 1.4, in case of clearing of failure F1, if c1 has a priority higher than c2, b2 (protecting c2) will be released. In order to avoid loss of traffic, a further backup connection is calculated for protecting c2 (further segments are required in the network), afterwards b2 is released and consequently the traffic can be reverted from the backup b1 to the intended connection c1. This second solution has the same disadvantages of the first solution, that is to require the definition of a rule and to require more network resources; moreover, the second solution is possible in a network controlled by a central manager, because the manager stores the list of all connections (and the priorities) of the controlled domain, but is not possible in a network controlled by a distributed manager, because each CPE stores only the list of the connections (and the priorities) starting from the controlled network element.

SUMMARY OF THE INVENTION

In view of drawbacks of the known solutions, the main object of the present invention is to provide a method to support a better network resources usage; this is performed by a method according to claim 1. The basic idea is to:

a) check a reversion blocked status of the first intended connection by checking if the segments of the first intended connection are available or not available; and in case of detecting the reversion blocked status of the first intended connection b) identifying activated backup connections using the not available segments of the first intended connection and identifying the corresponding intended connections;

c) checking the reversion blocked status of each identified corresponding intended connection by checking if the corresponding segments are available or not available; and, in case of detecting the reversion blocked status of an identified corresponding intended connection, d) checking if a corresponding not available segment is included in the first backup connection.

Advantages of this solution are better network resources usage, automatically deadlock detection, small time required for the detection and not to require the definition of any rule for the connections. A correlated advantage is the detection of the intended connections involved in the deadlock; this is performed by a method according to claim 2.

BRIEF DESCRIPTION OF THE DRAWINGS

FIG. 1.1-1.5 show an example of the steps required for a deadlock involving two intended connections of a telecommunication network.

BEST MODE FOR CARRYING OUT THE INVENTION

Figure 13:
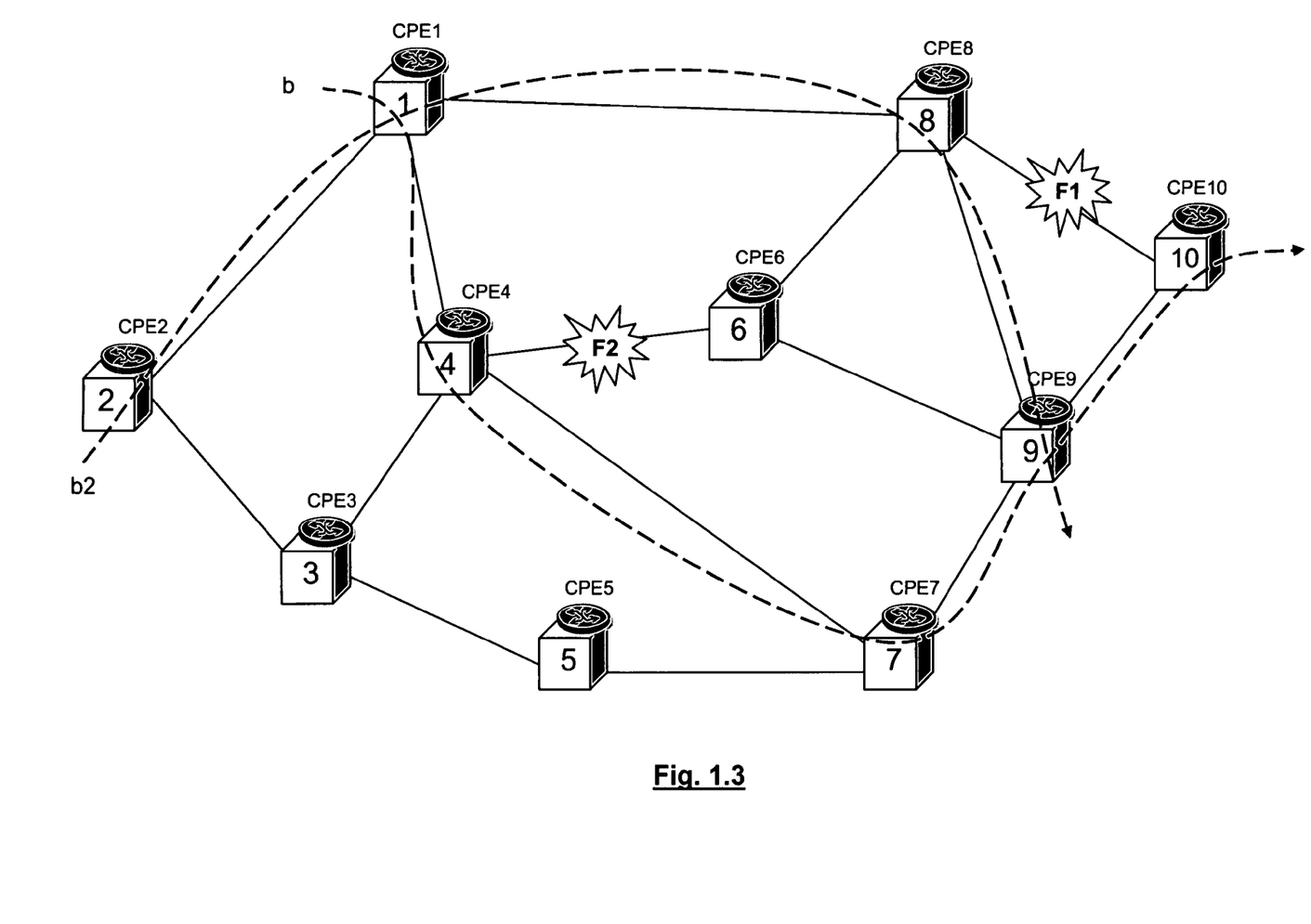

In traffic engineered networks complete sharing of network resources is applied, in order to achieve the best usage of network resources, and consequently the deadlock can occur if no rules are defined. In this case nowadays the network operator could only detect from a network management station an alarm for indication of a reversion blocked status of an intended connection for indicating that although no failure is present on the intended connection, reversion from the backup to the intended connection is not possible because at least one segment of the intended connection is not available but now the network operator also needs to know the reason of the reversion blocked status, which can be a deadlock or can be a different reason. For example the unavailable segment of a first intended connection can be used by a second backup connection protecting a second intended connection in a not revertible status indicating that the second backup connection is protecting a second intended connection for a failure on at least one segment on the second intended connection (this is shown in FIG. 1.3: if F1 clears, traffic can't be rerouted from b to c1); in this case, the reversion from the second backup connection (b2) to the second intended connection (c2) is not possible while avoiding loss of traffic. On the contrary, in the case of a reversion blocked status for a deadlock, the network operator needs to know the deadlock situation and eventually the intended connections involved in the deadlock.

Figure 3:
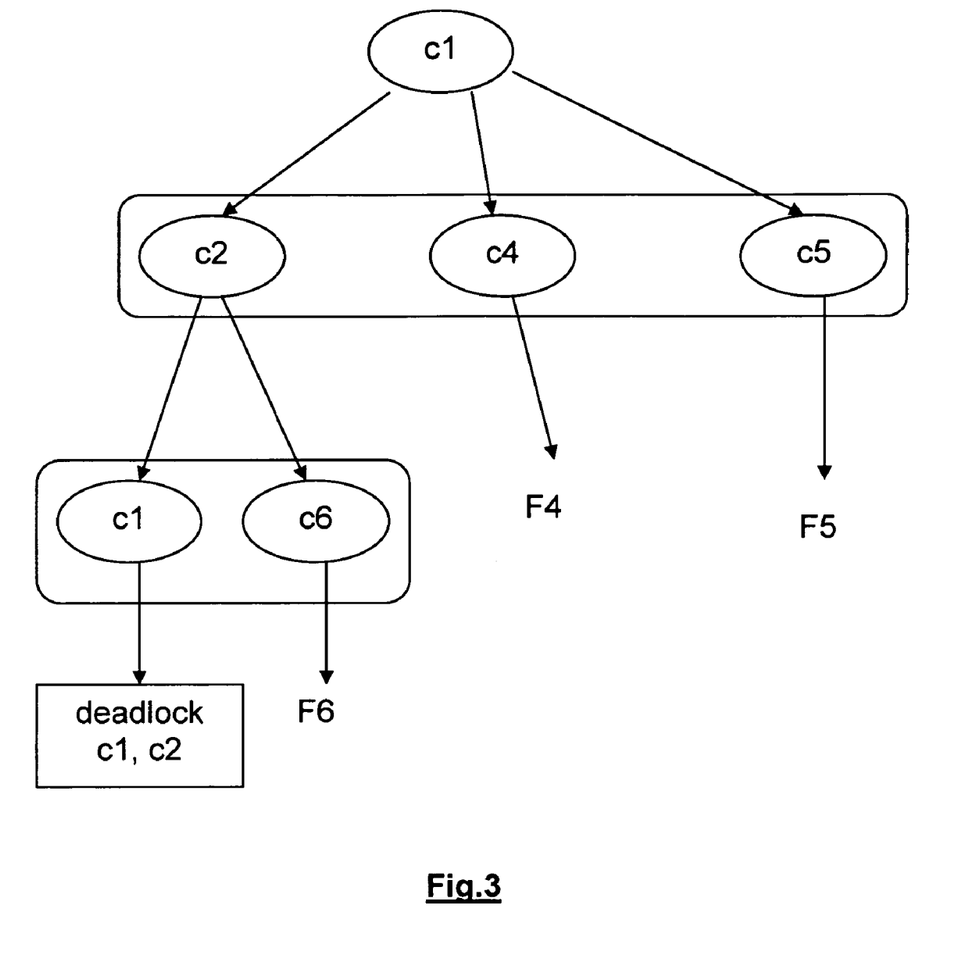
FIG. 3 shows schematically the inventive method for deadlock detection of the two intended connections of FIG. 1.5.
Figure 11:
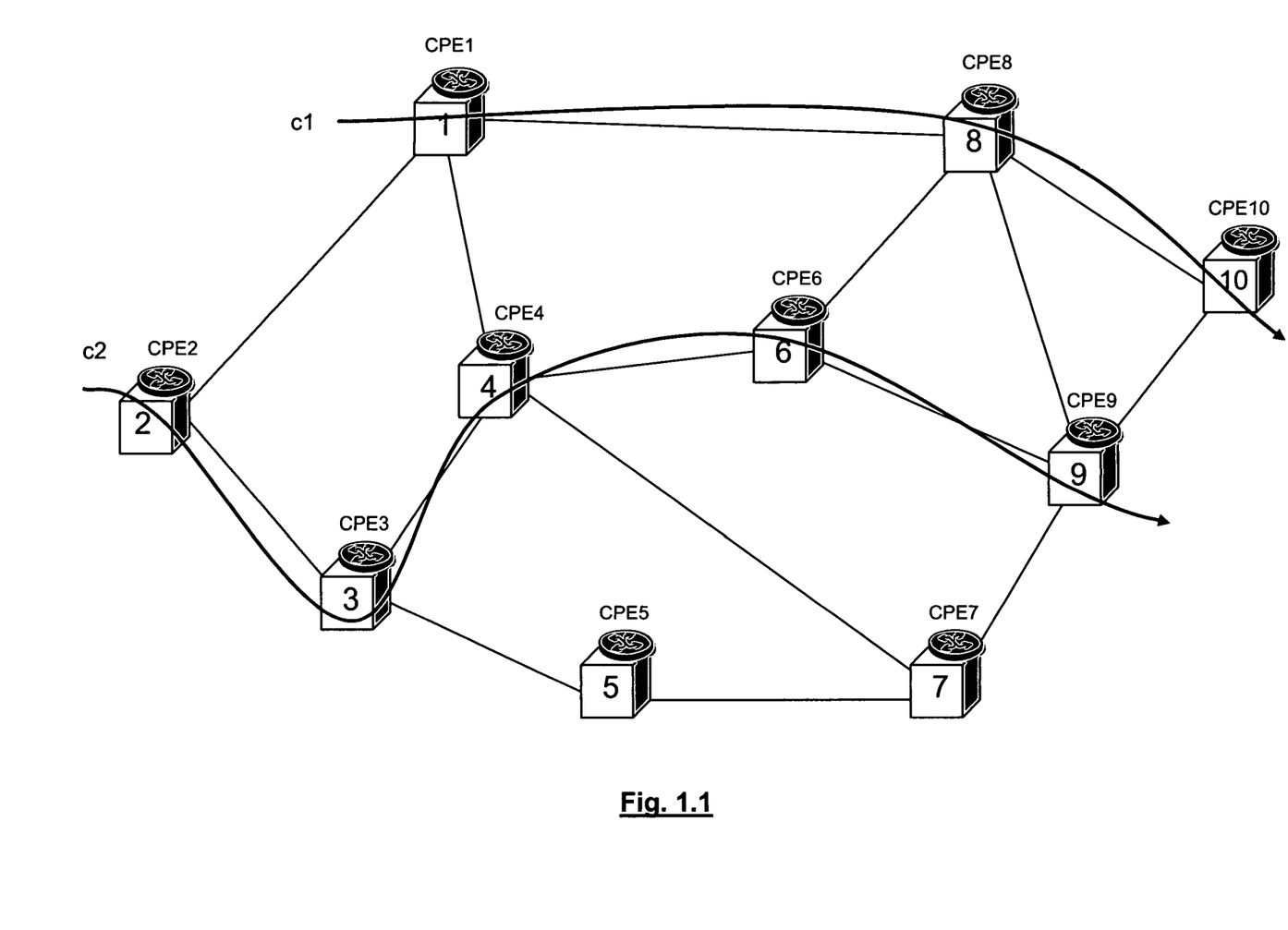
Figure 12:
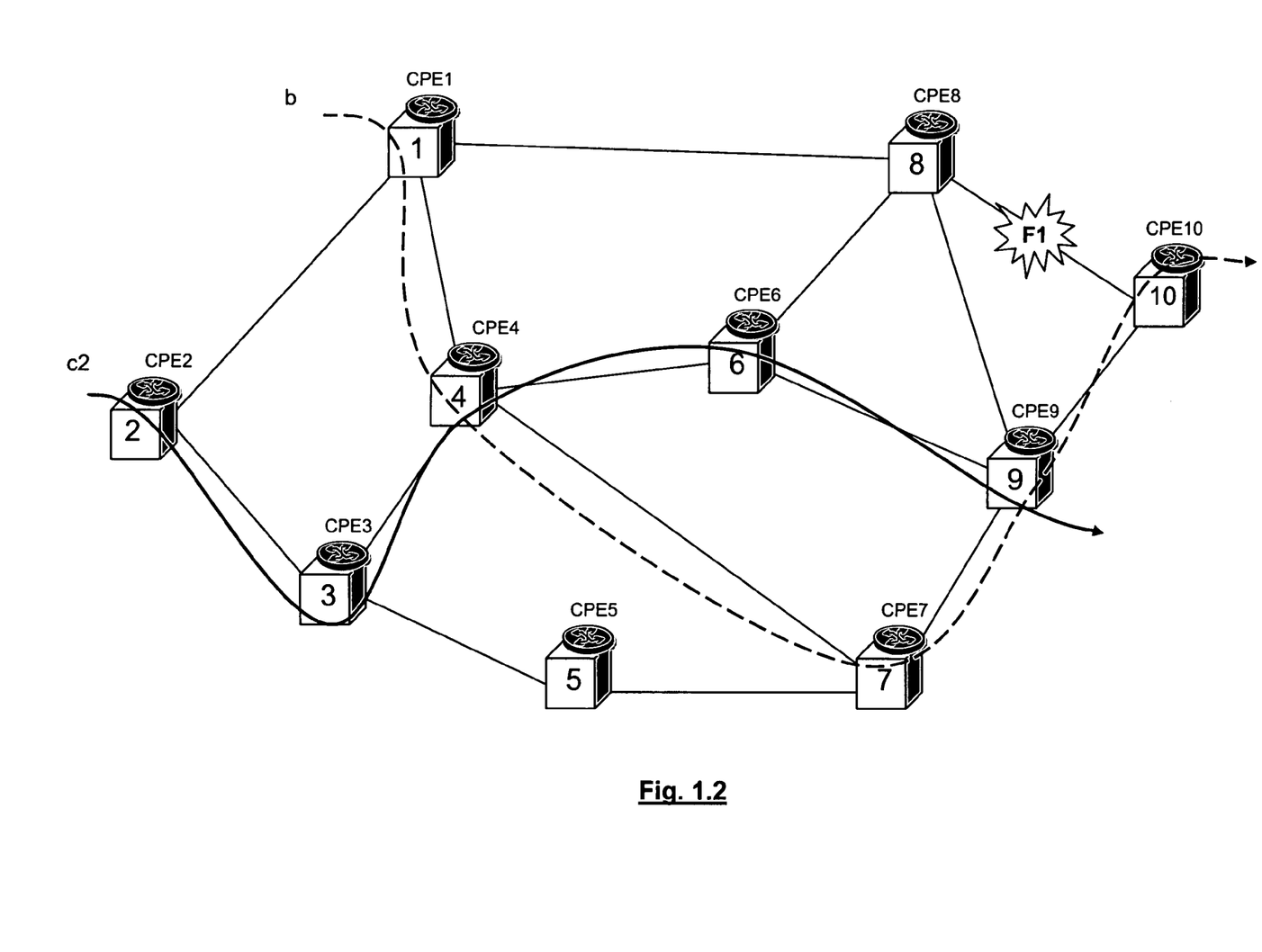

Referring to FIG. 3, FIG. 1.1 and FIG. 1.5, the manager (centralized or distributed) controlling the first intended connection c1 protected by the first backup connection b1, checks the status of c1 and detects a reversion blocked status for c1 indicating that it is not possible for the reversion from b1 to c1, because at least one segment of c1 is not available. In case of a central manager storing into the MIB the list of identifiers of the intended connections and storing for each intended connection the source, destination and intermediate network elements, after receiving the indication of clearing of F1 (for example from network element 8 detecting the clearing of F1), reads the stored information and checks if all segments of c1 are available and detects that at least one segment is not available (segment 1-8 of FIG. 1.5). The reason of the reversion blocked status can be that at least one second backup connection is using one segment of c1 for protecting a second intended connection affected by a failure or the reason can be a deadlock involving c1. After detecting the reversion blocked status for c1, the manager controlling c1 identifies the activated backup connections using the not available segments of c1 and identifies the intended connections corresponding to these activated backup connections. The result is a first list including the corresponding intended connections protected by the backup connections using at least one segment of c1 and blocking the reversion from b1 to c1; this list includes c2, c4 and c5. For each identified corresponding intended connection of the first list the manager checks the status, which can be again reversion blocked or not revertible; the reversion blocked status indicates that reversion from backup connections of the first list to the corresponding intended connections is not possible because at least one corresponding segment of the corresponding intended connection is not available, while the not revertible status indicates that reversion is not possible because the corresponding intended connection is affected by a failure. In the example of FIG. 3, c2 is in the reversion blocked status, while c4 and c5 are in a not revertible status for failures F4 and F5 on intended connections c4 and c5 respectively (c4, b4, c5, b5, F4, F5 and F6 are not shown in FIG. 1.1 and FIG. 1.5). For each identified corresponding intended connection in the reversion blocked status the manager checks if a corresponding not available segment is included in the first backup connection b1 and, if this occurs, it detects the deadlock involving the first intended connection and the identified corresponding intended connection. In this example the manager controlling c2 checks if a not available segment of c2 (2-3 in FIG. 1.5) is included in the first backup connection b1. This is achieved by identifying the activated backup connections using the not available segments of c2 and identifying the intended connections corresponding to these activated backup connections. The result is a second list including the intended connections protected by backup connections blocking the reversion from b2 to c2. In the example of FIG. 3, the second list includes c1 and c6: this means that c2 is reversion blocked by c1, but c1 is also reversion blocked by c2, and this is the indication of the deadlock involving c1 and c2, which are blocked by each other. Finally, the manager controlling c6 detects the not revertible status of c6 for failure F4 on c6 (c6, b6 and F4 are not shown in FIG. 1.1 and FIG. 1.5). FIG. 3 shows the method starting from c1, but the same result (that is deadlock detection involving c1 and c2) is achieved starting from c2, with different first and second connection lists.

Figure 4:
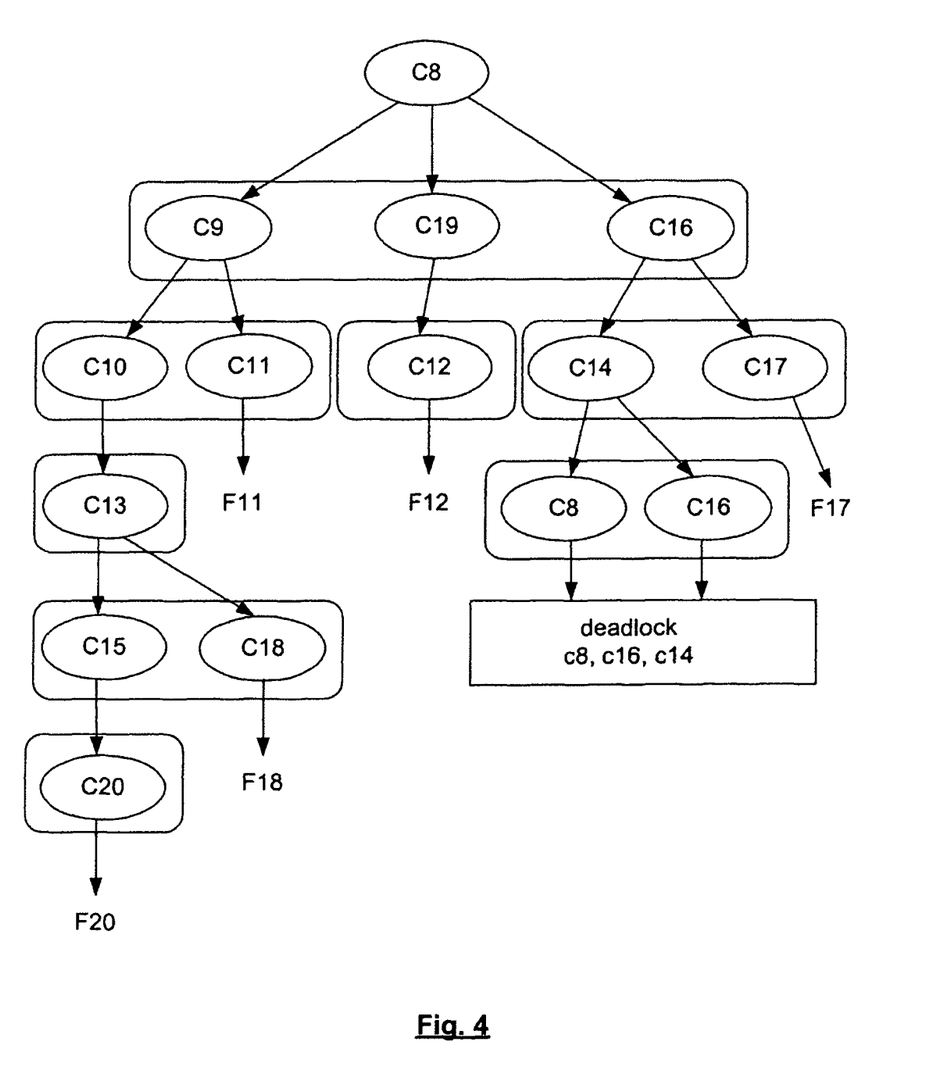
FIG. 4 shows schematically the inventive method for deadlock detection of three intended connections.

Referring to FIG. 4, a more generic scenario is shown for a deadlock involving three intended connections. The manager controlling c8 checks the status of the first intended connection c8, detects the reversion blocked status of c8 and identifies a first list of second intended connections protected by second backup connections using at least one segment of c8: this first list includes c9, c19 and c16. The manager checks the status of c9, c19 and c16: c9, c19 and c16 are again in the reversion blocked status. The method is iterated starting from each second intended connection of the first list in the reversion blocked status. Starting from c9, a second list of third intended connections protected by third backup connections using at least one segment of c9 is identified: this second list includes c10 and c11 and doesn't include c8, therefore no deadlock is detected. The manager checks the status of c10 and c11: c11 is in a not revertible status for failure F11, while c10 is again in a reversion blocked status. Starting from each third intended connection of the second list in the reversion blocked status, that is from c10 in this example, a third list of fourth intended connections protected by fourth backup connections using at least one segment of c10 is identified: this third list includes c13 and it doesn't include any previous reversion blocked intended connection, that is neither c8 nor c9 (no deadlock detected). The manager checks the status of the fourth intended connections of the third list, that is the status of c13, which is again in the reversion blocked status. Starting from each fourth intended connection of the third list in the reversion blocked status, that is from c13, a fourth list of fifth intended connections protected by fifth backup connections using at least one segment of c13 is identified: this fourth list includes c15 and c18 and doesn't include any previous reversion blocked intended connection, that is neither c8 nor c9 nor c10 (no deadlock detected). The manager checks the status of the fifth intended connections of the fourth list, that is the status of c15 and c18: c15 is again in the reversion blocked status, while c18 is in a not revertible status for failure F18. Starting from each fifth intended connection of the fourth list in the reversion blocked status, that is from c15, a fifth list of sixth intended connections protected by sixth backup connections using at least one segment of c15 is identified: this fifth list includes c20 and doesn't include any previous reversion blocked intended connection, that is neither c8 nor c9 nor c10 nor c13 (no deadlock detected). The manager checks the status of c20, which is in a not revertible status for failure F20: the method hasn't detected any deadlock involving connections c8, c9, c10, c11, c13, c15, c18 and c20, because failures F11, F18 and F20 are present in the network. The method is iterated considering the subsequent reversion blocked second intended connection of the first list, which is c19. In this case the second list includes c12, which is in a not revertible status for failure F12: the method hasn't detected any deadlock involving c8, c19 and c12, because failure F12 is present in the network. Finally, the method is iterated considering the last reversion blocked second intended connection of the first list, which is c16. Starting from c16, a second list of third intended connections protected by third backup connections using at least one segment of c16 is identified: this second list includes c14 and c17. c17 is in a not revertible status for failure F17, while c14 is again in a reversion blocked status. Starting from each third intended connection of the second list in the reversion blocked status, that is from c14, a third list of fourth intended connections protected by fourth backup connections using at least one segment of c14 is identified: this third list includes c16 and c8. c16 is already included in the first list: this indicates a deadlock, involving c8, c16 and c14. In fact, no failures are present on the intended connections c8, c16 and c14, but reversion is not possible because they are blocked by each other. The third list includes also c8, which is the first intended connection in the reversion blocked status: this again indicates a deadlock involving c8, c16 and c14.

FIG. 4 shows the method starting from c8, but the same result (that is deadlock detection involving c8, c16 and c14) is achieved starting from any intended connection involved in the deadlock, that is starting from c16, c14 or c8, with different lists. Moreover, FIG. 4 shows a third list including two intended connections (c8 and c16), which are both included in a previous list, and consequently there are two possibilities for detecting the deadlock, but this third list could include only one intended connection already included in a previous list (only c8 or only c16) and the same result (deadlock detection involving c8, c16 and c14) is achieved.

The inventive method can be performed through a software program running on hardware of a central management station or running on hardware of a CPE of an ASON network. The central management station can be a workstation or a personal computer, while the hardware of the CPE can be a microprocessor, external or embedded into an ASIC (Application Specific Integrated Circuit) or into a FPGA (Field Programmable Gate Array). The programming language can be for example C, C++ or Java.

For the network operator the result of the software program is a graphic user interface, which includes not only a first indication of the reversion blocked status of an intended connection, but also a second indication of the deadlock involving the intended connection. In case of detecting the deadlock, the graphic user interface can also include an indication of the intended connections involved in the deadlock. Referring for example to FIG. 4, the graphic user interface can include an indication of the deadlock and also an indication of the involved connections c8, c16 and c14.

In case of a central management station, it will start the deadlock detection for example after a request from the network operator, who detects an alarm indicating a reversion blocked status of an intended connection and starts the method from this intended connection. The network operator can detect the alarm from more than one intended connection and can start the deadlock detection procedure for example from the intended connection corresponding to the first alarm received. In case of a CPE, each source CPE will react automatically and will perform independently the method for deadlock detection, starting from the controlled intended connection. Referring to the example of FIG. 4, CPE controlling c8 will start to perform the method starting from c8, like shown in FIG. 4, while CPE controlling c16 will start from c16 and consequently will build different lists and CPE controlling c14 will start from c14. Anyway, the result will be the same, that is each CPE will detect the deadlock involving c8, c16 and c14.

A signaling protocol can be used to carry messages between the CPEs and an extension of the protocol is required for performing the inventive method, for example defining a new message or defining a new field into a known message. In particular, the RSVP protocol can be used, defining a new object into the Path_err message and a new object into the Notify message. Moreover, each intermediate CPE further stores information of the connections crossing the controlled network element and specifically identifiers of the intended connections and for each intended connection the address of the source CPE (that is the CPE controlling the source network element of the intended connection); this is required for notification of a failure as fast as possible to all the source CPEs controlling the intended connections crossing the failed segment and also for notification of a not available segment to a source CPE requesting the not available segment for configuration of a connection. Storing of this information can be performed during set-up of the intended or backup connection when transmitting the Path message, using a new object of the Path message or using the already defined Notify Request object: after receiving the message carrying information of identifier of the intended connection and address of the source CPE, each intermediate CPE will store locally this information. Referring to FIG. 1.5 and FIG. 3, the source CPE controlling the reversion from b1 to c1 (that is CPE1 controlling network element 1) periodically checks if all segments of c1 are available transmitting a Path message for requesting the configuration of c1, but receiving a Path_err message indicating that at least one segment on c1 is not available: this is the indication that c1 is in the reversion blocked status. Alternatevely, CPE1 receives through the signalling protocol an indication of the clearing of failure F1 on c1, for example through a new object into the Notify message. According to RFC2205 (9/1997), the Path_err message includes the address of the CPE controlling the network element which has detected the error, that is of the network element adjacent to the not available segment (for example intermediate CPE8 for not available segment 2-8), but in order to perform the inventive method CPE1 needs to know the addresses of the source CPEs controlling the intended connections protected by backup connections using the not available segments of c1 and it also needs to know identifiers of these intended connections. The new object into the Path_err message is used for carrying this information and the new object into the Notify message for performing the inventive method. In this example CPE1 receives from CPE8 the Path_err message which includes not only the address of CPE8 (which has detected the error) but also the address of source CPE2 and identifier of the controlled intended connection c2, because c2 is protected by b2 using segment 1-8 of c1. CPE1 further receives from the CPE controlling the network element of c1 adjacent to the segment used by b4 a Path_err message including the address of this CPE, the address of the source CPE4 controlling c4 and identifier of c4. Finally CPE1 receives from the CPE controlling the network element of c1 adjacent to the segment used by b5 a Path_err message including the address of this CPE, the address of source CPE5 controlling c5 and identifier of c5. The result is a first list including addresses of source CPEs and identifiers of the controlled intended connections protected by the backup connections using segments of c1.

Afterwards CPE1 requests the status of the intended connections of the first list by transmitting to CPE2, CPE4 and CPE5 a Notify message, which includes a new object indicating the address of the source CPE of the first list, identifiers of the controlled intended connections and the request of the status of the controlled intended connections; thus the new object of the Notify message transmitted to CPE2 includes the address of CPE2, identifier of c2 and the indication of the request of the status of c2, while the new object of the Notify message transmitted to CPE4 includes the address of CPE4, identifier of c4 and the indication of the request of the status of c4 and finally the new object of the Notify message transmitted to CPE5 includes the address of CPE5, identifier of c5 and the indication of the request of the status of c5. CPE2, CPE4 and CPE5 will answer respectively to the request by transmitting to CPE1 a Path_err message indicating the status of the controlled intended connections, which can not be revertible for a failure or can be reversion blocked. In the first case the message will include the indication of a failure (and eventually the address of the CPE controlling the network element detecting the failure), the address of the source CPE controlling the intended connection affected by the failure and identifier of the intended connection affected by the failure. In the second case the message will include the indication of a reversion blocked status of an intended connection, the address of the source CPE controlling the intended connection in the reversion blocked status and identifier of the intended connection in the reversion blocked status; the message will also include the address of the source CPE controlling the intended connection protected by the backup connection blocking the reversion and identifier of the intended connection protected by the backup connection blocking the reversion. Specifically, CPE2 will transmit to CPE1 the new Path_err message comprising the new object including the address of CPE2, identifier of c2 and an indication of reversion blocked status of c2; the new object further includes the address of CPE1 and identifier of c1. CPE2 will also transmit to CPE1 the new Path_err message comprising the new object including the address of CPE2, identifier of c2 and an indication of reversion blocked status of c2; the new object further includes the address of CPE6 and identifier of c6. CPE4 will transmit to CPE2 the new Path_err message including an indication of a failure, the address of CPE4 controlling c4 affected by the failure and identifier of c4 affected by the failure. CPE5 will transmit to CPE2 the new Path_err message including an indication of a failure, the address of CPE5 controlling c5 affected by the failure and identifier of c5 affected by the failure. The result is a second list including addresses of source CPEs and identifiers of the controlled intended connections protected by the backup connections using segments of c2. CPE1, after receiving from CPE2 the Path_err message including the address of CPE2, identifier of c2 and indication of reversion blocked status of c2, the address of CPE1 and identifier of the controlled connection c1 protected by b1 blocking c2, detects the deadlock, which involves the intended connections c1 and c2. Finally CPE1, after receiving from CPE2 the Path_err message including the address of CPE2, identifier of c2 and indication of reversion blocked status of c2, the address of CPE6 and identifier of the controlled connection c6 protected by b6 blocking c2, CPE2 transmits to CPE6 the new Notify message including the address of CPE6, identifier of c6 and the indication of the request of the status of c6; afterwards CPE6 will transmit to CPE2 a not revertible status of c6, that is the new Path__err message including an indication of a failure, the address of CPE6 controlling the intended connection affected by the failure and identifier of c6 affected by the failure.

It must be noticed that CPE2, CPE4, CPE5 and CPE6 detect the reversion blocked status or the not revertible status as explained for CPE1, that is transmitting the Path message and receiving from the intermediate CPEs the Path_err message including the list of the intended connections protected by backup connections blocking the reversion or including an indication of a failure on the intended connection and address of CPE detecting the failure; for example intermediate CPE8 transmits to source CPE2 a Path_err message including the address of CPE1 and identifier of c1. Afterwards, CPE2, CPE4, CPE5 and CPE6 transmit to CPE1 the indication of reversion blocked or not revertible status as explained above.

The new messages of the signalling protocol indicated above are transmitted by the control plane elements; each CPE is a hardware device which includes hardware means (for example a transmitter) adapted to transmit the messages to the other CPEs and includes hardware means (for example a receiver) adapted to receive the messages from the other CPEs.

The invention claimed is:
1. Method for checking deadlock in a telecommunication network including a first activated backup connection for protecting traffic over a first intended connection calculated by a traffic engineering tool, the method comprising the following steps:
  Checking, by a device, a reversion blocked status of the first intended connection indicating that a reversion from the first activated backup connection to the first intended connection is not possible, by determining a not available segment by checking if resources of the first intended connection are available or not available; char- acterized by, in case of detecting the reversion blocked status of the first intended connection;

identifying at least one activated backup connection using the not available resources of the first intended connection and identifying at least one intended connection currently protected by the at least one activated backup connection;

checking a reversion blocked status of the at least one identified intended connection indicating that a reversion from the at least one activated backup connection to the at least one identified intended connection is not possible, by checking if the resources of the at least one identified intended connection are available or not available; and, in ease of detecting a reversion blocked status of the at least one identified intended connection;

checking if a not available resources of the at least one identified intended connection is included in the first activated backup connection.

2. Method according to claim 1, wherein the deadlock involves the first intended connection and at least one identified intended connection if the not available resource of the at least one identified intended connection is included in the first activated backup connection.

3. Method according to claim 2, wherein the resource of the first intended connection is a segment identified by two network elements of the first intended connection and wherein the resources of the at least one identified intended connection are segments identified by two network elements of the at least one identified intended connection, and wherein the telecommunication network includes:

a first source control plane element for controlling a source network element of the first intended connection and the first activated backup connection, the first source control plane element being identified by a first address and the first intended connection by a first identifier;

a second source control plane element for controlling a source network element of one of the at least one identified activated backup connection and for controlling one of the at least one identified intended connection, the second source control plane element being identified by a second address and the identified intended connection by a second identifier, a first intermediate control plane element for controlling a network element adjacent to the not available segment of the first intended connection and storing the second address and the second identifier;

the first source control plane element, second source control plane element and first intermediate control plane element being interconnected with each other through a signalling protocol, and the identified intended connection is identified by transmitting from the first intermediate control plane element to the first source control plane element the stored second address and the stored second identifier.

4. Method according to claim 3, wherein the telecommunication network further comprises a second intermediate control plane element for controlling a network element adjacent to the not available segment of the identified intended connection, the second intermediate control plane element storing the first address and the first identifier, and where the reversion blocked status of the at least one identified intended connection is checked by:

receiving at the first source control plane element from the first intermediate control plane element the stored second address and the stored second identifier and afterwards transmitting from the first source control plane element to the second source control plane element a request of the reversion blocked status of the at least one identified intended connection, the received second address and the received second identifier;

receiving the request of the reversion blocked status of the at least one identified intended connection at the second source control plane element and afterwards transmitting from the second source control plane element a request for configuration of the identified intended connection;

receiving at the second source control plane element from the second intermediate control plane element the first address and the first identifier.

5. Method according to claim 4, further transmitting from the second source control plane element to the first source control plane element the received first address, the received first identifier and an indication of the reversion blocked status of the identified intended connection.

6. Method according to claim 5, where the check if the not available resources of the at least one indentified intended connection is included in the first activated backup connection is performed at the first source control plane element after receiving from the second source control plane element the first address, the first identifier and an indication of the reversion blocked status of the identified intended connection.

7. The method according to claim 3 further comprising transmitting a message of a signaling protocol, the message being transmitted from the first intermediate control plane element to the first source control plane element and including a field indicating the stored second address and the stored second identifier.

8. The method according to claim 4 further comprising transmitting a message of a signaling protocol, the message being transmitted from the first source control plane element to the second source control plane element and including a field indicating the request of the reversion blocked status of the at least one identified intended connection, the received second address and the received second identifier.

9. The method according to claim 5, further comprising transmitting a message of a signaling protocol, the message being transmitted from the second source control plane element to the first source control plane element and including a field for indicating the reversion blocked status of the identified intended connection.

10. A non-transitory computer readable medium encoded with computer executable instruction that when executed by a computer cause the computer to perform:

checking deadlock in a telecommunication network including a first activated backup connection for protecting traffic over a first intended connection calculated by a traffic engineering tool, by:

checking a reversion blocked status of the first intended connection indicating that a reversion from the first activated backup connection to the first intended connection is not possible, by determining a not available segment by checking if resources of the first intended connection are available or not available; characterized by, in ease of detecting the reversion blocked status of the first intended connection;

identifying at least one activated backup connection using the not available resources of the first intended connection and identifying at least one intended connection currently protected by the at least one activated backup connection;

checking a reversion blocked status of the at least one identified intended connection indicating that a reversion from the at least one activated backup connection to the at least one identified intended connection is not possible, by checking if the resources of the at least one identified intended connection are available or not available; and, in case of detecting a reversion blocked status of the at least one identified intended connection;

checking if a not available resource of the at least one identified intended connection is included in the first activated backup connection;

wherein an intended connection comprises a plurality of communicatively coupled network elements;

wherein a backup connection comprises at least one network element that is not in the intended connection;

wherein an activated backup connection is a plurality of communicatively coupled network elements comprising at least one network element that is not in the intended connection; and wherein resources of a connection comprises at least one of a segment of a connection and a portion of bandwidth of the segment, where the segment is a link that communicatively' couples a first network element and a second network element.

* * * * *